United States Patent [19]

Kirchner et al.

[11] Patent Number: 4,665,519
[45] Date of Patent: May 12, 1987

[54] WIRELESS COMPUTER MODEM

[75] Inventors: Tommy L. Kirchner; George F. Vargo, Jr.; Steven C. Cantrell, all of Richland, Wash.

[73] Assignee: Electronic Systems Technology, Inc., Kennewick, Wash.

[21] Appl. No.: 794,664

[22] Filed: Nov. 4, 1985

[51] Int. Cl.[4] ............................. H04J 3/24; H04B 1/38
[52] U.S. Cl. .............................................. 370/94; 375/8
[58] Field of Search ..................... 370/60, 94, 95, 85; 375/7, 8; 179/2 DP

[56] References Cited

U.S. PATENT DOCUMENTS

| | | | |
|---|---|---|---|
| 3,869,577 | 3/1975 | Couturier et al. | 375/8 |
| 4,007,449 | 2/1977 | Vercesi | 375/8 |
| 4,425,664 | 1/1984 | Sherman et al. | 375/8 |
| 4,574,378 | 3/1986 | Kobayashi | 370/94 |

Primary Examiner—Douglas W. Olms
Assistant Examiner—Frank M. Scutch, III
Attorney, Agent, or Firm—Wells, St. John & Roberts

[57] ABSTRACT

A wireless modem includes a radio transceiver and microprocessor-based controlling circuitry. Two or more modems can be individually ported to host computer devices to link them within a computer local area network. Computer data is broadcast in discreet packets which individually contain address information and error detection information that can be processed by the receiving modem. Each modem is programmed to normally operate in a standby receiving condition. Broadcast signals are processed and decoded by the addressed modem prior to being converted to a machine readable format for transfer to a host computer device. The receipt of one packet of data must be verified by the receiving modem before a transmitting modem can broadcast a subsequent packet. Test systems are also provided for monitoring the operational status of a local area network without requiring operational use of host computer devices ported to the modems within the network.

15 Claims, 11 Drawing Figures

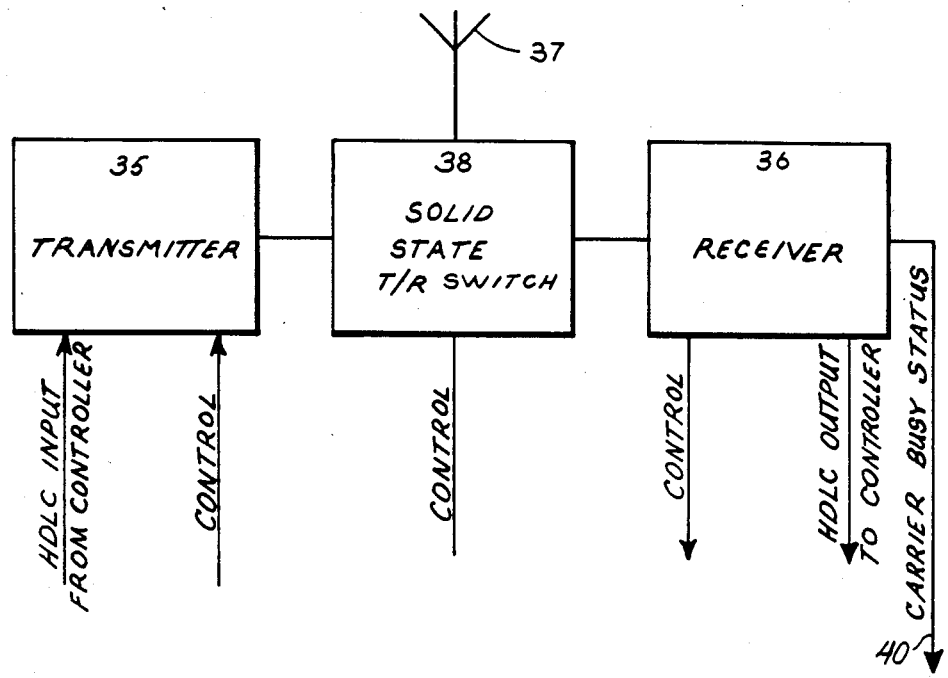

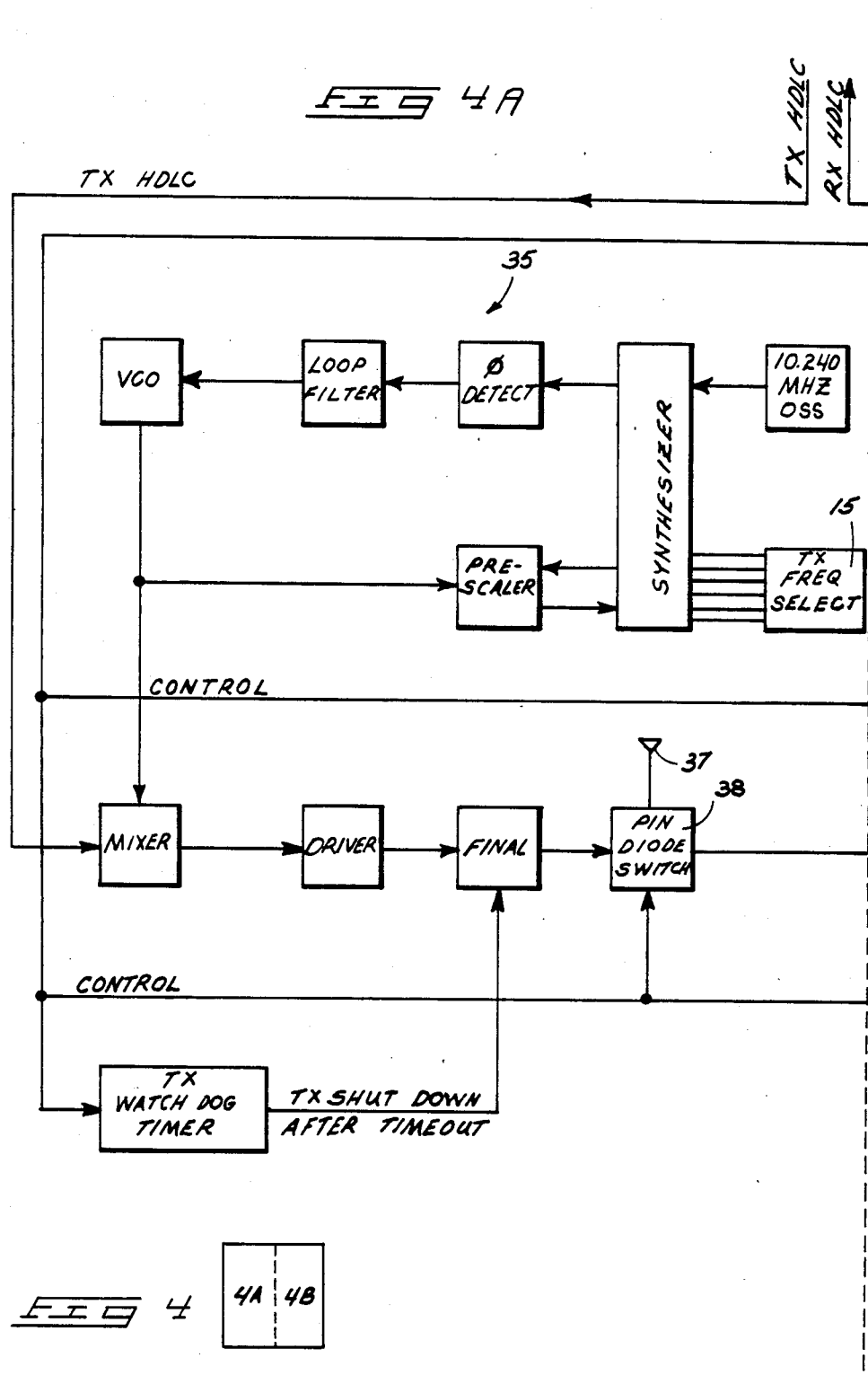

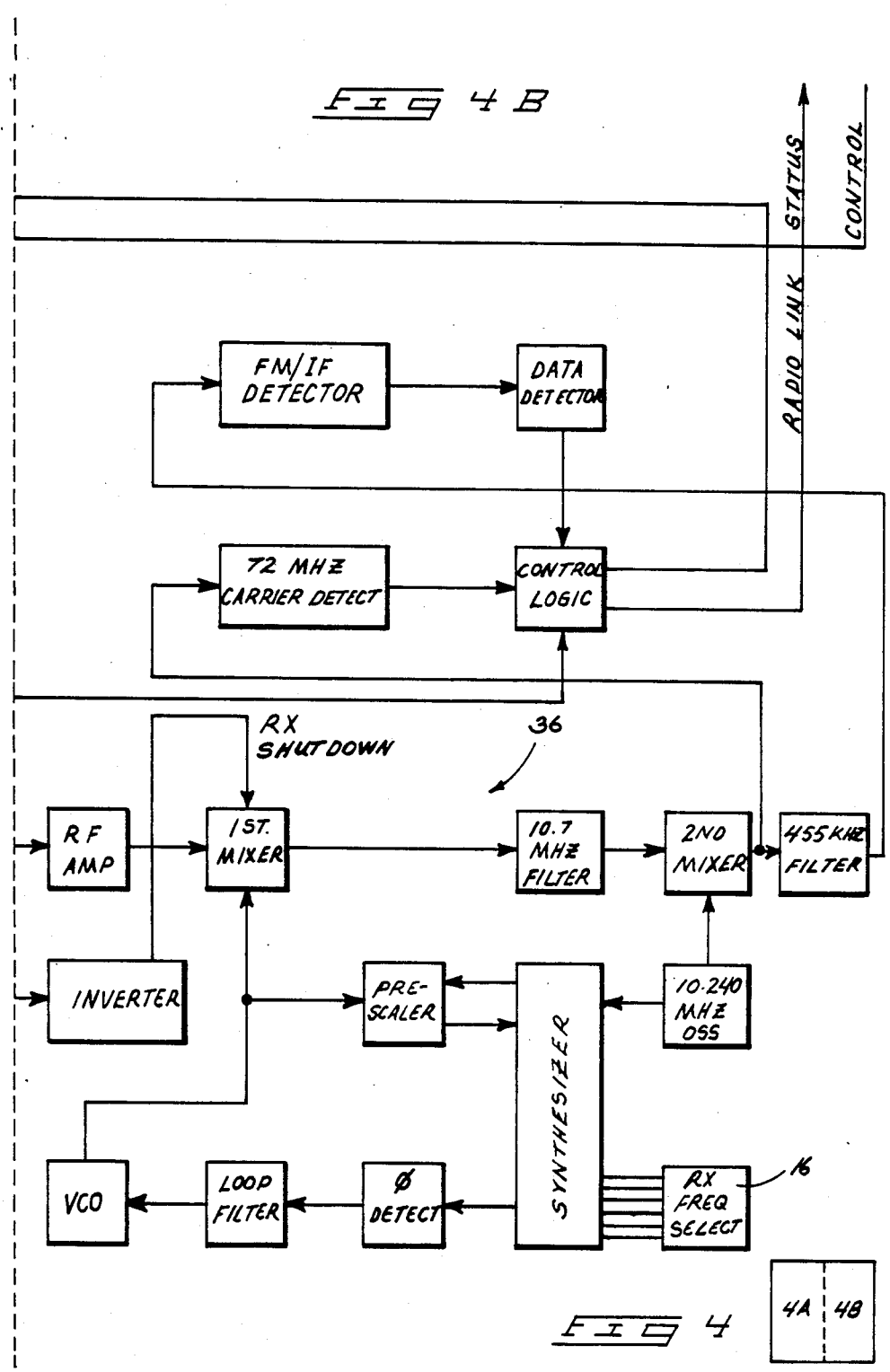

WIRELESS COMPUTER MODEM

FIELD OF THE INVENTION

This disclosure relates to wireless modems for communication between computers, terminals, and other peripheral computer equipment, such as printers, memory units, etc. It provides a networking communication link between such computer equipment regardless of the individual communicating speeds of the network components.

BACKGROUND OF THE INVENTION

Most communication links between computer devices are provided by direct cable connections or by modems that transmit data over telephone lines. Direct cable connections are relatively expensive to install. Communication between equipment connected by cables requires that each piece of equipment operate with a common communication protocol. When computer equipment is connected through telephone modems, each component must not only operate with a common protocol, but the user must either maintain or pay for the use of the connecting telephone lines.

The present invention arose from an effort to connect computer equipment in a network without cables or phone lines. It utilizes available low cost radio transmitters and receivers to send data between computer equipment. It not only permits part or all of the computer equipment to be portable, but also allows communication between individual machines that operate at different communication speeds. It can be used to connect a variety of computer devices in a network that might be located in a single building, or within a larger geographic area. It facilitates physical rearrangement and substitution of equipment. It can extend the availability of computer equipment, such as microcomputers, printers, and storage data bases, by permitting access to them through one or more low cost terminals.

BRIEF DESCRIPTION OF THE DRAWINGS

The invention is illustrated in the accompanying drawings, in which:

FIG. 3 is a simplified block diagram of a transceiver;

FIGS. 4, 4a and 4b are a more detailed block diagram of the transceiver;

FIGS. 5, 5a and 5b are a block diagram of the controller circuitry;

DETAILED DESCRIPTION OF THE PREFERRED EMBODIMENT

In compliance with the constitutional purpose of the Patent Laws "to promote the progress of science and useful arts" (Article 1, Section 8), applicant submits the following disclosure of the invention.

INTRODUCTION

The features of the present invention are illustrated in detail by a preferred embodiment that is in the form of a VHF FM radio modem which allows communication between computers and peripherals via radio frequency waves. With the increased expansion of computer use in industry, for tasks ranging from office management to industrial controls, has come a need for computers and computer systems to communicate with each other. Applications of local area networking have been in existence for nearly a decade; but costs and complexities have limited availability to a minority of users.

The modem described below is a low cost unit that plugs into any standard RS-232C communications port commonly available on computer equipment for digital data networking. It eliminates the cost of cabling and phones lines used for intraoffice and building communications. The unit also provides communications mobility for portable usage within an office or plant environment.

The present modem allows full duplex communication using the RS-232C serial data communication standard as defined by the Electronic Industries Association (EIA) for asynchronous/synchronous communication between computers and computer peripherals, from 110 to 9,600 baud in standard increments. The modem is a microprocessor-controlled device that allows full networking of up to 254 users on a single carrier frequency. The receiver/transmitter used is a narrow band VHF FM unit which uses digital frequency synthesis techniques for channel selection. The encoding of the transmitted data is via High Level Data Link (HDLC) format using packet data transmission techniques to ensure error free data transmission. Commercial security of transmitted data can be ensured by a user definable 8 bit code and the internal HDLC format.

Figure 5A:
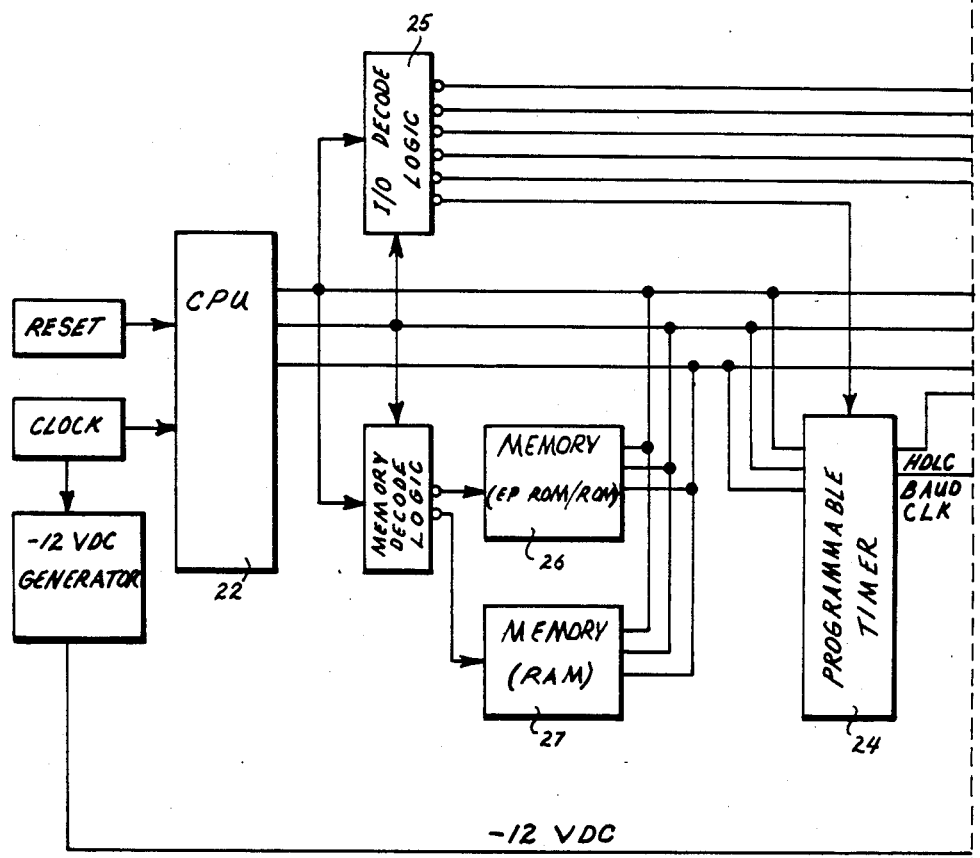
Figure 5B:
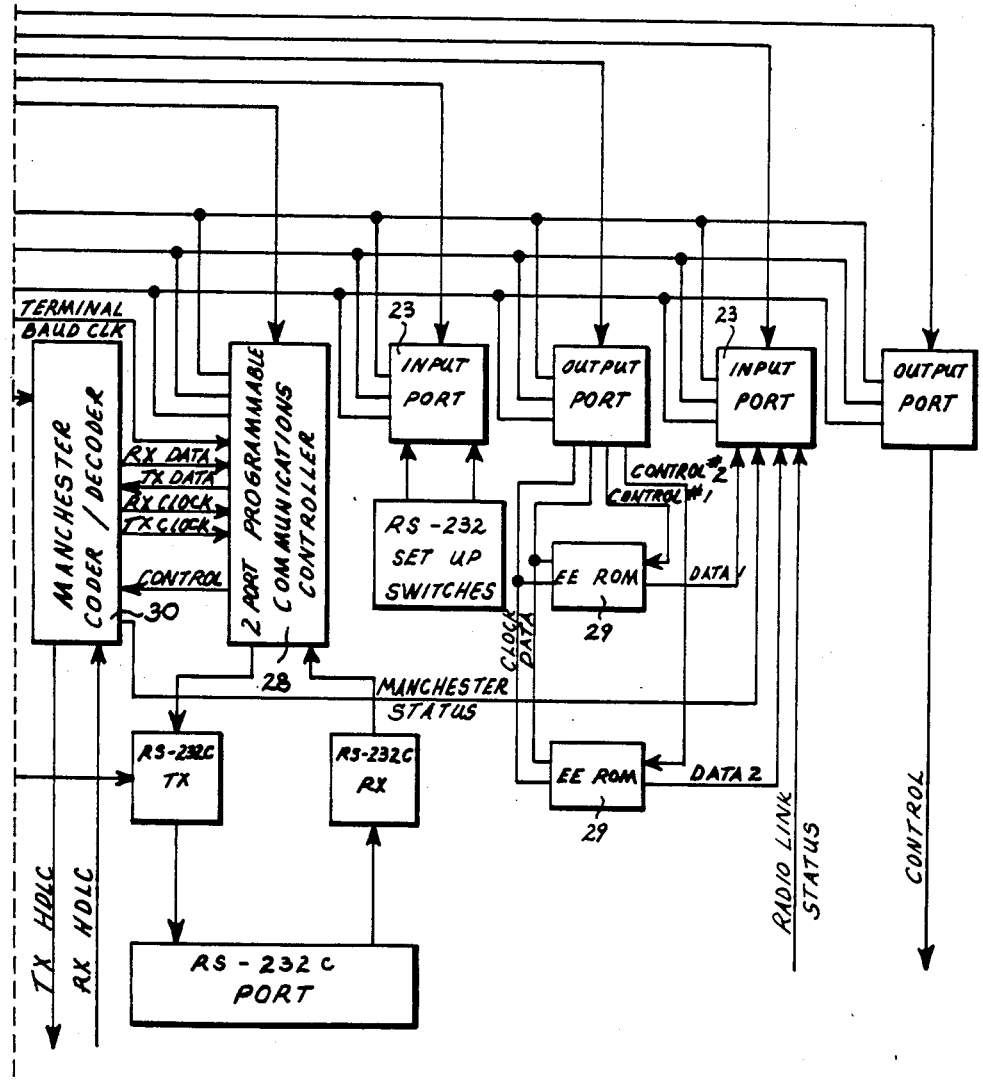

As shown in FIG. 5 of the drawings, each modem contains a central processing unit 22 in the form of a microprocessor. The central processing unit (CPU) 22 operates the various elements that together comprise a modem. The CPU 22 in turn is controlled by interconnected hardware elements, such as a serial input/output device or communications controller 28, and by software instructions stored within memory devices, such as an EPROM 26. The interrelation between the hardware and software components in this embodiment will be evident from the detailed descriptions which follow.

The transceiver of each modem (FIGS. 3-4) is capable of operating in either a receiving mode or in a transmitting mode. When operational, each modem will always be functioning in a stand-by receiving mode unless it is broadcasting radio signals. To initiate transmission of data between two devices connected to individual modems, the user must first establish a communication link between the two devices. This is accomplished by directing command signals to the intended transmitting modem from its host equipment. After a transmission link has been established to the receiving modem, the microprocessor of the transmitting modem automatically controls transmission of data as directed by conventional communications software in its host equipment. The details of such communications software are well known, and a description of them is not believed to be necessary in order to understand the operation of the modem which is the subject of this disclosure. A current example of such software is Softalk, available from Microsoft Corporation.

Figure 1:
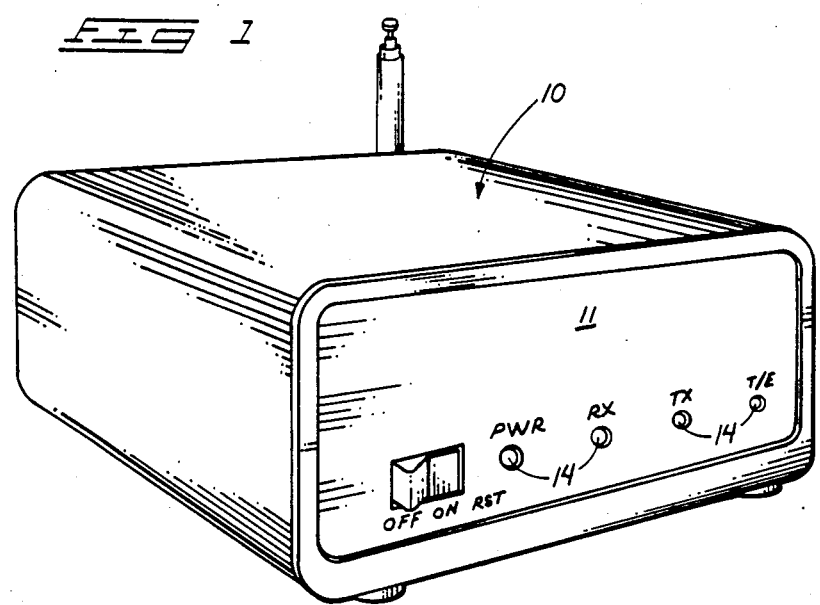
FIG. 1 is a front perspective view of a modem.
Figure 2:
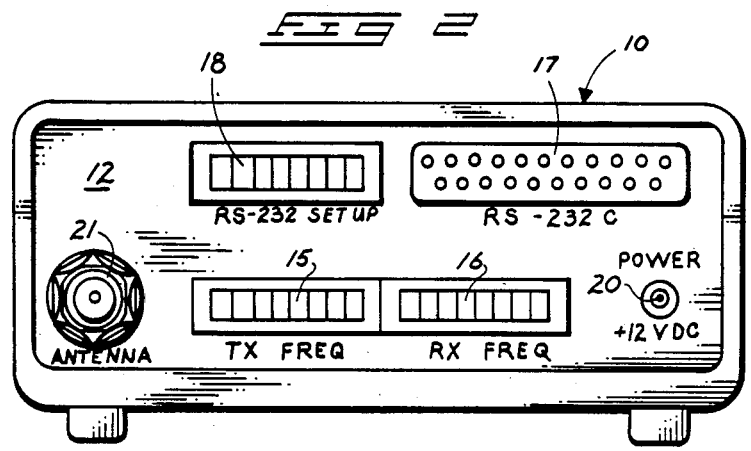
FIG. 2 is a rear elevation view.

The externally controllable features of a modem are shown in FIGS. 1 and 2, which is shown as being housed within an enclosure 10 having a front panel 11 and a rear panel 12.

The front panel 11 includes a manual three-position power switch 13 movable between "on", "off", and "reset" positions. Four light emitting diodes (LED) or indicators 14 are arranged across the front panel 11 to visually indicate the operating condition of each modem. The indicators are labeled "PWR" for indicating that power is on, "RX" for indicating that the receiver has detected transmission of a signal from another modem, "TX" for indicating that the transmitter of the modem is broadcasting a signal, and "T/E" for indicating that operation of the Test/Enable system built into the modem has been initiated.

The rear panel 12 has three sets of eight bit dip switches which respectively serve as transmitter frequency select switches 15, receiver frequency select switches 16, and RS232C setup switches 18. It also is provided with a conventional RS232C connector 17, a direct current power connector 20 and an antenna connector 21. The antenna connector 21 can mount an antenna 37 directly at the back of the enclosure 10, as shown in FIG. 1, or it can be connected to a remote antenna.

The use of the present modems allows communications between any host computer device having a standard RS-232C interface with an effective operating radius dependent upon the antenna selected and the operating environment within which the modems are used. Each modem's digitally synthesized transceiver gives the user a choice of operating frequencies and the capability of networking numerous users on a single broadcast frequency channel. This is accomplished by giving each modem a unique address, utilizing a "listen before transmit" scheme, employing packet radio, and using a packet communication protocol.

The software and hardware of each modem can assure complete data reliability by applying known error checking procedures to all received data. If the data is altered during transmit the receiving unit tells the sender to retransmit. This applies only to the packet in error, not the whole data file. Each modem provides total flow control by automatically buffering the data when high speed data devices (i.e., 19,200 baud) are communicating with low speed devices (i.e., 300 baud). It provides transmitted data security by the use of the HDLC format, which is Manchester coded, and by a user unit address. It also provides a "test/enable" routine which is used to check the validity of the RF link without the aid of an external computer or terminal.

The general structure of the transceiver is shown in FIG. 3. It includes a transmitter (TX) 35 and a receiver (RX) 36 connected to a common antenna 37 by a solid state switching circuit 38. These three units are each controlled by CPU 22. In addition, receiver 36 includes circuitry for monitoring the status of the channel on which the wireless modem network is operating. Since the receiver 36 is operational at all times other than when its paired transmitter 35 is transmitting RF signals, it continuously monitors transmissions by all other transmitting modems on the selected network channel. If transmitter 35 or any other RF transmitter is transmitting RF signals on the selected network channel, the status line 40 will be "high". This signal is then processed by CPU 22 to delay transmission of signals by transmitter 35.

Details of the transceiver circuit are more fully illustrated in FIG. 4.

Figure 6:
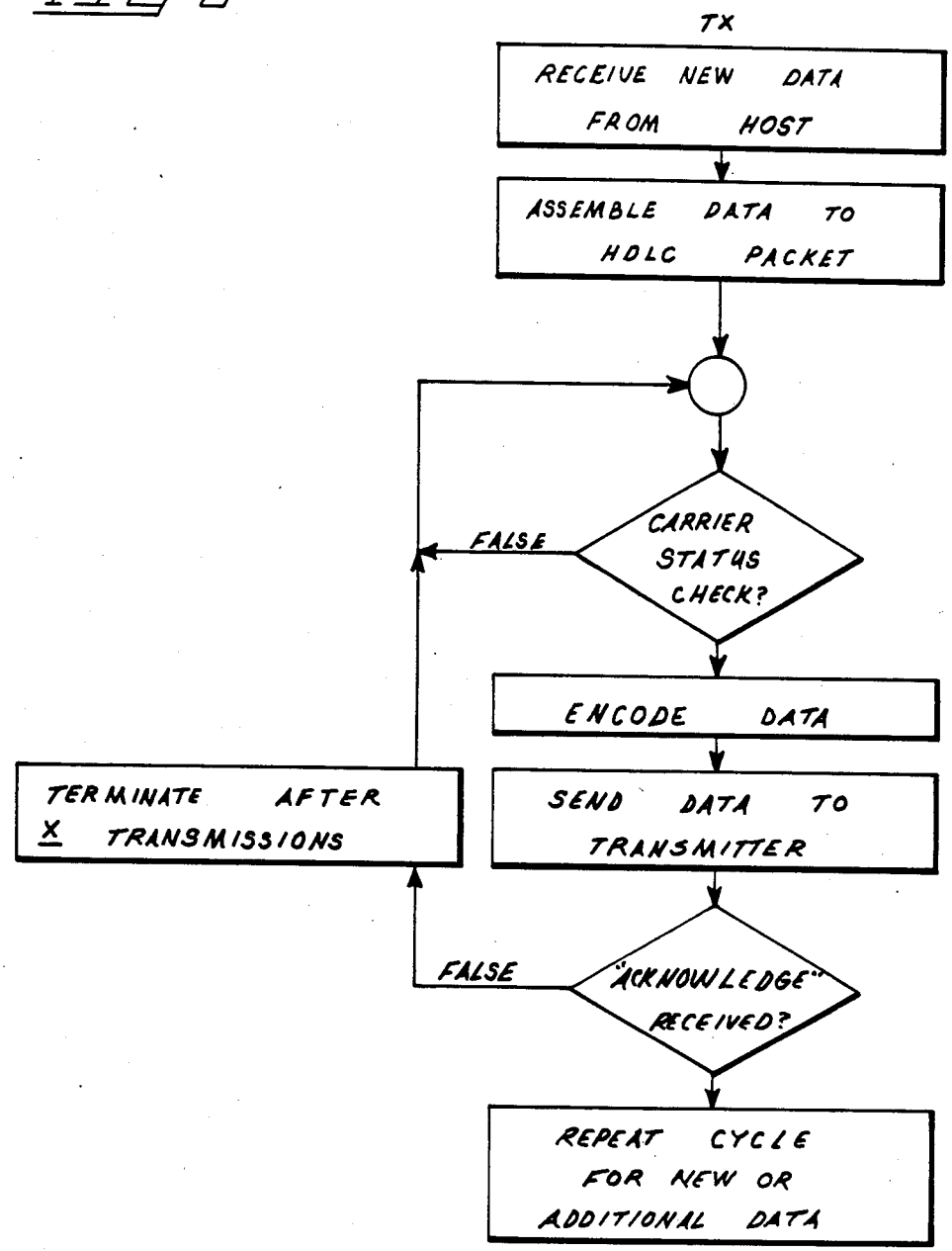
FIG. 6 is a firmware flow diagram of the transmitting sequence.

The general steps involved in transmitting data are outlined in the firmware flow sheet in FIG. 6. When the CPU 22 receives a signal from the host equipment to transmit data, it first processes the incoming data to compress the serial bits by stripping away those bits that do not pertain directly to the information that is to be transmitted and converts the data to a High Level Data Line Control (HDLC) format. The compressed data from the serial input/output circuit is then passed through a Manchester coder/decoder, shown at 30 in FIG. 5, which converts the data to a clocked string of signals for synchronous reception by the addressed modem. The coded signals are then directed to the radio transmitter 35 and are broadcast.

Figure 7:
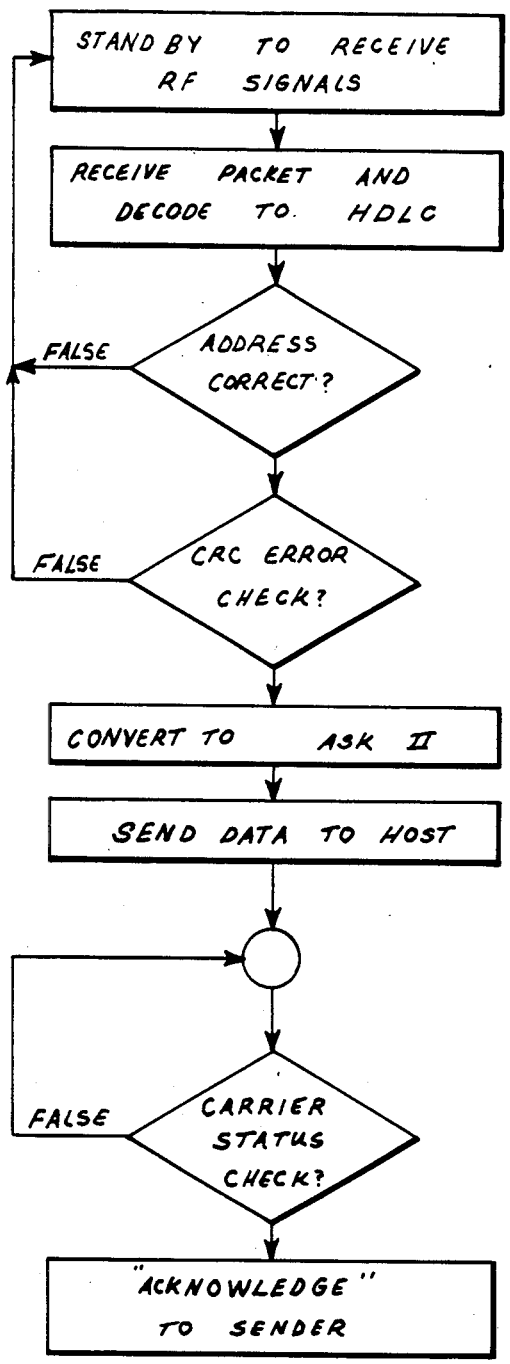
FIG. 7 is a firmware flow diagram of the receiving sequence.

The general steps involved in receiving data are outlined in the firmware flow chart shown in FIG. 7. Each operative modem is always maintained in a receiving mode unless it is transmitting data. The broadcast signals will therefore be picked up by every modem in the geographic area through which the signals are broadcast. The software instructions for each CPU 22 are preprogrammed to identify its designated address. As each frame of data is received at a modem, the software controls will cause the CPU in the receiving modem to compare the receiver address in the frame of data to the pre-established address for the particular modem. If the two are not identical, the modem will discard the received information and await receipt of a subsequent data transmission on the carrier frequency being used.

If a received string of data includes an address matching that of the receiving modem, the CPU in the receiving modem will initially check the accuracy of transmission by use of an alogarithm. If the resulting signal matches the encoded signal within the transmitted frame, the frame of information is then transferred to the host equipment wired to the receiving modem. Receipt of the signal is verified by a "handshake", at which time the receiving modem transmits an ACKNOWLEDGEMENT signal back to the transmitting modem.

The transmitting modems are preset to repeat transmission of each frame of data unless an ACKNOWLEDGEMENT signal is received within a predetermined time after transmission of the data. After receiving the ACKNOWLEDGEMENT signal, the transmitting modem receives additional data from its host computer device and repeats the transmission process until all of the data being sent through the modem has been transmitted and acknowledged.

Because of the vagaries of radio transmission, particularly within building and vehicle structures, it has been found advisable to provide the modems with circuitry for readily testing the reception and transmission of signals at specific locations without connecting the modems to any computer equipment. This is physically accomplished by utilizing the unneeded Bit 8 switch on the RS-232 setup switches 18 as an "On/Off" switch for initiating a test/enable routine provided in the software for each modem. The test/enable routine of a receiving modem emulates host equipment. Its operation is initially indicated by flashing an indicator 14 on the front face of the modem panel, which is labeled "test/enable".

A second modem can be utilized in the "test/enable" condition at a second location to send a test packet of data to the receiving modem under internal software control. This is accomplished through its CPU under software emulates computer equipment from which data would be transmitted. A test packet of data is automatically transmitted from the transmitting modem to the receiving modem and processed in precisely the same way as a packet of data being communicated between actual computer devices. After the received signal has been fully processed by the receiving modem, the resulting ACKNOWLEDGEMENT signal extinguishes the indicator on the transmitting modem to confirm successful transmission to information. By this method, one can survey the practicality of radio transmission between the modems in a particular building, room, or other physical locale, including the feasiblity of using portable equipment, such as in vehicles.

It is also possible to make a complete survey of practical modem placement locations in a building or area by continuous transmission of a carrier signal from a portable modem to a desired receiving location. One can then detect the reception of this carrier frequency on one or more stationary or portable receiving modems by observing operation of the RECEIVING LED provided in the indicators 14 on the front panel 11 of the modems. The software controlling the microprocessor for the transmitting modem is programmed to transmit the carrier signal upon actuation of power switch 13 to the reset condition.

THEORY OF OPERATION

Packet Radio

The modem employs packet swtiching techniques. These methods were pioneered on the wired networks often referred to as X0.25 protocol used by Common Carriers for both domestic and international data communications. Use of these techniques results in improved data integrity and dramatic gains in spectrum efficiency.

All packet switched systems, whether land, line, or radio based, share a common principle of operation. Data is assembled into blocks before transmission. Each block is a form of an "electronic envelope" which in addition to the data, carries addressing and validation information. This "envelope" is referred to as a packet.

The maximum packet size handled by the modem can be defined by the user. This packet size is determined by average message size, nominal bit error rate (BER) and throughput considerations. If the data input to the modem is greater than the maximum size of a single packet, then multiple transmissions are sent.

This process of assembling data into packets at the transmitting unit and stripping away the envelope at the receiving unit is transparent to the user.

ERROR CHECKING

When each data packet has been completed, it is broadcast by the radio transmitter within the sending modem. The packet will be received by all modems in the network within range and operating on the same channel. It will be ignored by all modems except the one that was specifically addressed. On receipt, the addressed station will immediately check validation bits which are appended to the data. If the packet is correct, a positive ACKNOWLEDGE signal is sent to the originating unit, confirming its receipt. If the data was in error no ACKNOWLEDGE signal will be transmitted, causing the sending modem to retransmit the data. The number of data retries is defined by the user.

The validation process is essential to the operation of a packet system. There are a variety of methods used for such purposes, ranging from simple parity sums to sophisticated Cyclic Redundancy Checks (CRC). Parity checking is easy to implement, but suffers from an inability to detect two bit inversions. The CRC routine is much more complicated, but offers corresponding improvements in performance. The present system preferably uses the CRC method.

Spectrum Utilization

The modem utilizes a "listen before transmit" scheme or Carrier Sensed Multiple Access (CSMA). This means that only one unit can transmit at a time on a selected channel. In order to understand spectrum utilization something must be known about the average data traffic generated by a modem or work station on a per unit time basis.

If for example one assumes that the modems send data at the rate of one 250 character message over 4 minutes on the average (where a character is defined as any combination of 8 bits) one can compute the average data rate per second for any population of users. The data flow per channel is 8.33 bits per second. If the channel rate is assumed to be 2400 bits per second, then in theory the modem system could support as many as 288 users at a time, providing that perfect scheduling of the channel was possible.

Without getting into detailed mathematics, it can be shown that a modem network using the above parameters can service 100 users on a single channel with delays on the order of 2.5 seconds. By way of comparison, a polling system using a 48 bit polling message would take an average of 2 seconds before polling any one station with a maximum of 4 seconds delay possible under the same conditions.

Packet Protocols

The modems use CSMA and do not require a polling station or a token. If a modem has traffic to offer to the channel it will "sense" the channel and if it is free, transmit its data and await an Acknowledgement. If the channel is in use, it will wait until it is clear to transmit its packet.

It is possible using the CSMA method that conflicts may arise and packets of broadcast data will overlap on the channel. When this occurs some method is needed to prevent two o more modems for continually retransmitting their packets and overlapping again. The present system solves this problem by invoking a second random delay. When a packet fails to generate a corresponding ACKNOWLEDGE signal, the originating modem will wait a random length of time before sensing the channel prior to a retry.

Buffering and Flow Control

There will be times when a unit will not be able to transmit its data as it arrives at its input port due to the fact that the channel is busy. If this condition occurs the packets are stored in the unit's internal memory until they can be transmitted. This buffering is essential when host computer devices connected to the network operate at speeds which are different from the communication speed of the network itself. At the present time a preferred embodiment of the system has modems which each have the capacity to buffer 512 bytes of data from the RS-232 input and 256 bytes from the receiver input.

As soon as buffering takes place or is even required, the possibility or buffer overflow and the resultant loss of data must be considered. Since buffering can take place at any point on the network, flow control at all levels must be supported to avoid losing data should a memory buffer overflow. The modems employ complete hardware and software handshaking between the physical device they are connected to and between each other on the RF link.

TECHNICAL DESCRIPTION

The preferred embodiment of the wireless modem as generally shown in FIGS. 4 and 5 was designed using the latest generation HC CMOS logic family which has the input and power supply characteristics of standard CMOS logic with the high speed and large output drive of the 54LS/74LS logic family.

The central processing unit (CPU)22 selected in the preferred embodiment is the CMOS version of the Z80 family produced by Zilog, Inc. The Z8300 chip combines the high performance of the Z80 CPU with the extremely low power consumption and identical pinout and instruction set of the Z80. The result is increased reliability and lower system power requirements. The decision to use the above logic families was made to decrease internal heat generation, increase system noise immunity, and to allow the modem to operate on battery power.

The user definable baud rate (110 to 9600) is set extremely by four dip switches in the RS 232C setup switches 18. The CPU 22 reads the I/O port 23 connected to switches 18 and programs a programmable timer 24 to operate at the baud rate selected. The memory decode logic circuitry 25 has been configured to address internal memory chips which are partitioned into EPROM/ROM and RAM devices shown at 26 and 27. The EPROM/ROM devices 26 are used to store the system software.

The actual data communications interface is handled by a dual-channel serial communications controller 28. Each channel can independently accommodate asynchronous protocols. One channel is used for the RS-232 communications. The second channel is used for generation of X0.25HDLC packets for broadcasting over the RF link. The controller 28 basically functions as a serial-to-parallel, parallel-to-serial converter that can be programmed by the CPU 22.

The binary data is transmitted in packets where the individual characters or bytes are run together with no space at all between the bits. This eliminates the need for both the start and stop bits, as well as dead time between characters, and results in very efficient information transfer. The format of this system guarantees a transition at least once in every five bit periods in order to keep the receiving modem operating in synchronism with the incoming data. Analog start and stop bits are only sent at the beginning and end of the packet, with the transmitter being keyed only while the information is actually sent. Extra information is inserted into each packet that enables the receiving modem to determine automatically if the packet was received without error.

The sending modem can keep retransmitting its information until it is assured that the data is error free. Additionally, to ensure synchronization of the received data, with the transmitted data, the transmitted data is Manchester coded by a coder/decoder circuit 30. This feature allows clock information to be inserted midway in time for each one or zero serial bit of information transmitted. The receiver extracts this clock signal from the incoming data stream and uses this clock information, which is now in synchronization with the data stream, to input the HDLC Packet into the Communications Controller 28.

The basic element in a packet of data is a frame, a string of bits with a specific format. The format for the frames is known as HDLC, or High Level Data Link Control. Each HDLC frame consists of six fields as shown below.

| Flag 1 | Address | Control | Data | FCS | Flag 2 |
|---|---|---|---|---|---|
| | | HDLC Frame | | | |

In order of transmission, Flag 1 is sent first. It is one byte (8 bits) long, consisting of a bit pattern that is unique to Flag 1 and Flag 2, and will appear nowhere else in the frame. Bit stuffing is used to ensure that this does not occur. Flag 1 field is sent prior to the transmission of the HDLC frame to capture the network.

The Address field is two bytes (16 bits) long; the first eight bits being the destination address for the data being sent and second eight bits being the source or originating address. The Control field is two bytes (16 bits) in length and contains system management information. The Data field consists of zero to 250 bytes (0 to 2000 bits) of information.

The frame check sequence (FCS), is a two byte (16 bits) field used to error check the complete HDLC frame. The FCS is separately computed by the receiving modem and if both numbers agree then the frame was correctly received.

The Flag 2 field is a one byte (8 bits) word consisting of a bit pattern identical to that of FIG. 1. It indicates to the receiving modem that the previous two bytes received were the FCS field. The Flag 2 field completes each frame sequence within a packet of data.

This HDLC frame is used to frequency modulate the radio frequency transmitter 35 (FIG. 3). The transmitter 31 is a digital synthesized unit that utilizes a user selectable broadcast frequency is selected discrete frequency channels. The receiver 36 is a dual conversion superheterodyne unit which uses a digital synthesized front end to allow the user to select one of the available discrete channels.

SOFTWARE DESCRIPTION

The current firmware configuration in each modem is made up of 28 separate modules linked together to form the complete software package for the wireless modem. Each module was created to perform a unique function, which usually corresponds to some unique hardware function of the modem.

Upon actuation of power switch 13 to power-up the modem (or actuation of the reset switch within the RS-232C setup switches), an initialization process takes place to clear certain hardware devices and initialize others to their normal operating configurations. After initialization has been completed, most of the software activity is accomplished by vector interrupts which are generated by the hardware. These vectors activate the appropriate firmware service routines which in turn accomplish the necessary command action.

Since the purpose of the modem is to provide a wireless network in which ASCII information can be transferred from one modem to another, buffering of both incoming and outgoing data is essential in order to assure orderly transmission and reception of data among users of the system. To handle both incoming and outgoing data the modem uses six internal data buffers located within the RAM memory 27. These data buffers are used as follows:

1. One data buffer is used to temporarily hold the incoming RS-232 data. It is named "RSRXBK".

2. One data buffer is used to store the data from the incoming RS-232 data buffer upon record termination while in Command Mode. This is done to allow the modem's command parser to parse for a command while still being able to process new incoming RS-232 data. This buffer is named "BVFKB".

3. One data buffer is used to store the data from the incoming RS-232 data buffer upon record termination while not in Command Mode. This is done to provide some data buffering before the data is moved to the radio output data buffer. This buffer is named "MESGBK".

4. One data buffer is used to store the outgoing RS-232 data. This buffer is named "RSTXBK".

5. One data bffer is used to store the outgoing Radio Data. This buffer is named "HDTXBK".

6. The last data buffer is used to receive the incoming radio data. This buffer is named "HYDRXBK".

As mentioned above, the software for the wireless modem is made up of twenty-eight modules. Basically these modules fall into four major types: Main, Subrout123ing, Interrupt Service Routines, and Data Definition. The following lists the modules under these four categories:

A. Type "Main"
 1. Module "WIRMOD"
 2. Module "MAINLP"
B. Type "Subroutines"
 1. Module "SETBD"
 2. Module "RSECHO"
 3. Module "ECHAWT"
 4. Module "CNBIAS"
 5. Module "PROMPT"
 6. Module "CRPKT"
 7. Module "CMDPAR"
 8. Module "CMDEC"
 9. Module "LSTCMD"
 10. Module "E2SAVE"
 11. Module "E2REST"
 12. Module "SAVDFT"
 13. Module "RESDFT"
C. Type "Interrupt Service Routines"
 1. Module "RSRXSR"
 2. Module "RSSPSR"
 3. Module "RSTXSR"
 4. Module "RSEXSR"
 5. Module "TIMER"
 6. Module "HDTXSR"
 7. Module "HDRXSR"
 8. Module "HDSPSR"
 9. Module "E2MSRV"
 10. Module "DUMSVR"
D. Type "Data Definition"
 1. Module "CMDTBL"
 2. Module "COPYRI"
 3. Module "RAMDEF"

Listed below are the names and general descriptions of the principal software subroutines included within the firmware for the modem:

WIRMOD (WIRLESS MODEM)

The purpose of this subroutine is to initialize the hardware after the following:
1. Modem power-up.
2. Hardware reset (front panel switch).
3. Software reset (initiated from the Command Mode).

Listed below is an outline of the WIRMOD subroutine:

1. Zero and size memory.
2. Initializes RAM perimeters variables.
3. Reads the configuration of the address, baud rate, and diagnostic switches.
4. Configures the two CTC integrated circuits for their respective system clock rates (two are used for the HDLC receive and transmit baud rates and one for the system timer.
5. Configures the two SIO channels, one for HDLC packet communication and the second for the user defined RS-232C communication port.
6. Prints user boot-up message and the current size of RAM memory.
7. Prints the appropriate prompt and transfer control to the routine named MAINLP.

HDTXSR (HDLC TRANSMIT SERVICE ROUTINE)

This interrupt service routine is activated upon the SIO HDLC TX buffer becoming empty. It is initiated by the MAINLP upon detecting a message full flag or a Send Acknowledge Flag. Upon receipt of either of the above flags the MAINLP transfers the appropriate packet into HDLC transmit buffer and sets the HDLC buffer full flag. This flags the Timer routine which initiates a HDLC transmit sequence. After satisfying certain timing delays the Timer starts the HDLC data transmit by sending a 8 bit character to the HDLC port of the SIO. After the SIO buffer becomes empty an interrupt vector is generated to the HDTXSR subroutine. If data is present HDTXSR sends another 8 bit character to the SIO satisfying the interrupt. After sending the last character, HDTXSR resets the SIO TX Interrupt Pending Flag and sets the RF Off delay flag which signals the TIMER subroutine to start a delay before turning off the RF.

HDRXSR (HDLC RECEIVE SERVICE ROUTINE)

This interrupt service routine is activated by receiving two or more HDLC flag bytes and the eight bit source identification byte. The SIO generates a vector driven interrupt from the next byte following the source identification byte. From this interrupt the HDRXSR transfers this type into the HDLC receive buffer and updates the byte count and pointer.

HDSPSR (HDLC SPECIAL SERVICE ROUTINE)

This interrupt service routine is activated upon receiving the HDLC Packet End Flag. After receipt of the end flag the HDSPSR checks for errors recorded by the SIO. If an error is detected the HDSPSR will report the error to the user RS-232C port and ignore the HDLC packet. If no errors are present the HDSPSR parces the incoming HDLC packet for the proper control byte. The control byte is checked for the following:
1. SABM Frame: Used form logging on.
2. Unnumbered Acknowledge Frame: Used for repeating SABM Frame.
3. Receive Ready Frame: Used to acknowledge information packets.
4. Information Frame: Used to transfer data.

After decoding the Control byte, the HDSPSR checks any packet sequence numbers where applicable. If a discrepancy is discovered the packet is disregarded and an error message is reported to the user RS-232C port. If HDSPSR finds no errors, the appropriate flags are set to signal MAINLP to take the appropriate action.

RSRXSR (RS-232C RECEIVE SERVICE ROUTINE)

This subroutine is activated upon receiving an error free RS-232C character from the user port. Upon activating the following duties are performed for user friendly communication:
1. Character echo if in full duplex.
2. Character detection from the buffer.
3. Reprint of current buffer in use.
4. Delete all characters from buffer.

If a Carriage Return character is detected or the buffer becomes full this subroutine transfers the information into the message buffer and sets the message buffer full flag. After the the full flag is set, control is returned to the main loop.

RSSPSR (RS-232C SPECIAL SERVICE ROUTINE)

This interrupt service routine is activated upon an error condition or from the user RS-232C receive port. After integrating the the SIO and if the error messages are enabled, a RS-232C RX Error is sent to the user. Upon completing the above, control is returned to the system.

RSTXSR (RS-232C TRANSMIT SERVICE ROUTINE)

This subroutine is activated when the SIO RS-232C TX Buffer becomes empty. When activated it checks for another character to send. If there is no more characters the TX INT is reset and the TX buffer status flag is updated, control is returned to the system.

TIMER

This interrupt service routine is activated 60 times a second via the CTC timer channel. This routine performs all the system time dependent functions listed below:
1. Update tick variable.
2. Update carrier busy time-out if enabled.
3. Update delay used for sending data if RF on is enabled.
4. Update delay used for turning RF off if enabled.
5. Blink test led if in test mode and if the link is down.

RSECHO (RS-232C ECHO)

The purpose of this routine is to print the desired message to the user RS-232C port. Messages are passed to this routine by register pointers. Each message is terminated by a termination byte of 0F hex.

CNBIAS (CONVERT BINARY TO ASCII)

This subroutine is used to cconvert 8 bit or 16 bit binary data into its appropriate 2 or 4 byte ASCII hex. Internal registers are used to pass the needed information to and from this routine.

PROMPT

This subroutine checks a RAM parameter variable for either "Command Mode" or "Converse Mode" and prints the correct prompt to the user RS-232C port.

MAINLP (MAIN LOOP)

This is the main idle loop subroutine which is executed during times when no serice routine is active. The main purpose of this routine is to coordinate all activities of the modem, this is accomplished by monitoring RAM flag bits for a change of state and initiating the appropriate action. The primary function of this routine is as follows:
1. Detect full message buffer: If this condition is met the information contained in the message buffer is moved into the HDLC transmit buffer if in the "Converse Mode"; or sent to the command parser if in the "Command Mode". If the link status is in the Down Condition and the modem is in the "Converse Mode" a "log on packet" is sent before the data is transmitted. After receiving a reply from the receiving modem the data packet is sent.
2. Detect Link Up: A message is sent to the user RS-232C port acknowledging this change of state.
3. Detect Link Down: A message is sent to the user RS-232C port acknowledging this change of state.
4. Acknowledge Pending: A reply packet is created and deposited into the HDLC transmit buffer and the HDLC buffer full flag is set.

FIG. 1

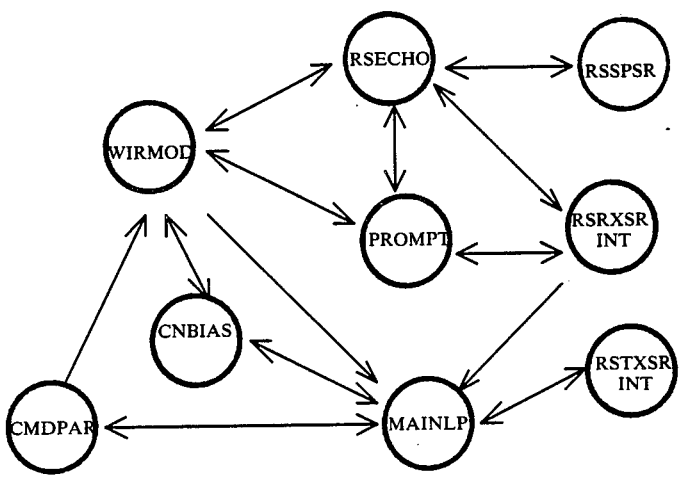

FIG. 1

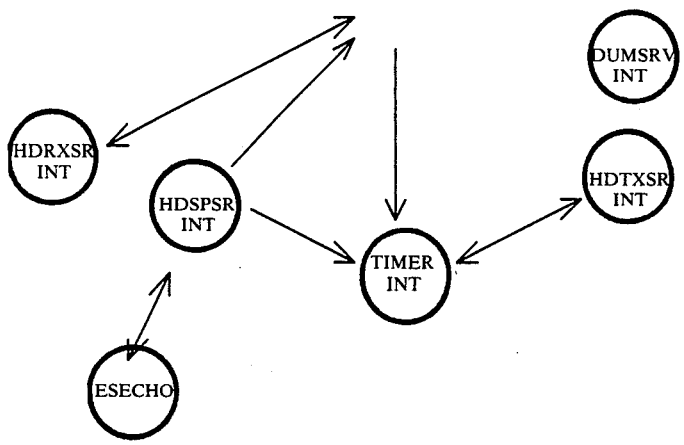

DUMSRV (DUMB SERVICE ROUTINE)

This routine defines unused interrupt vectors in the case of hardware faults. If there is an interrupt a selected location is incremented signaling an event which can be later analyzed.

CMDPAR (COMMAND PARSER)

This subroutine is used to parse incoming command strings for valid system commands while the modem is in COMMAND MODE. The parser will except variable length command and switch strings. Upon receiving a valid command, the Command Pauser returns a command number, a switch number, and a argument value. Those commands not having switch or argument values are assigned a zero. The pauser will report the following errors:
 1. To many characters for command.
 2. Ambiguous command.
 3. Invalid command.
 4. To many characters for switch.
 5. Ambiguous switch.
 6. Invalid switch.
 7. Invalid character for argument.
 8. Invalid argument.
 9. Argument overflow.

The following material describes in detail each of the twenty-eight modules in the controlling software:

MODULE #1
WIRMOD

Entry:
Upon powering the modem or upon generating a hardware reset or by entering the command "RESET", this software module is executed.
Referenced:
The following modules are called by this module: "SETBD", "E2REST", "ECHOWT", "CNBIAS", and "PROMPT".
Description:
The first task this module accomplishes is to initialize all the hardware I/O ports and to initialize the random access memory variables. The RS-232 port is configured to the setting of the RS-232 dip switch. To configure the random access memory variables, which in turn configures how the modem operates, this module reads stored default settings from non-volatile memory and stores them into the random access memory for later use.

Next, all the software adjustable clock rates are set to the desired rates. The module then defines the hardware interrupt structure and enables the maskable interrupts.

If enabled, a welcome message is sent by way of the RS-232 port. Also, if the modem is configured for Test Mode and the unit address is odd, a test packet is initiated.

On completion, this module jumps to module "MAINLP".

MODULE #2
SETBD

Entry:
Modules "WIRMOD" and "CMDEC" call this routine to set the software variable clock rates which are used to set the baud rates for the RS-232 port and the serial radio data port.
Referenced:
None.
Description:
The RS-232 port can be configured to the following rates: 110 bd, 300 bd, 600 bd, 1200 d, 2400 bd, 4800 bd, and 9600 bd.

The serial radio data port has the following possible data rates: 110 bd, 300 bd, 600 bd, 1200 bd, 2400 bd, 4800 bd, and 8800 bd.

On completion, this module returns to the calling module.

MODULE #3
RSECHO

Entry:
The following modules call this module "ECHOWT", "RSRXSR", "RSSPSR" and "HDSPSR".
Referenced:
None.
Description:
The purpose of this module is to conditionally transfer an ASCII string no larger than 256 characters to the RS-232 transmit buffer to be transmitted over the RS-232 port. This module expects the string to be terminated with a "SI" or OFH character.

If there is no room in the RS-232 transmit buffer, this module simply returns with a buffer full flag set indicating that it was not able to transfer the string of characters to the buffer.

After transferring the string of characters, this module then initiates character transmission if the modem is not currently transmitting and the flow control flag is not set, indicating that the user is ready to receive the message.

On completion, this module returns to the calling module.

MODULE #4

ECHOWT

Entry:
The following modules call this module: "WIRMOD", "PROMPT", "MAINLP", "CMDPAR", and "CMDEC".
Referenced:
The following module is called by this module: "RSECHO".
Description:
This module is used to send an ASCII string over the RS-232 port. This module calls "RSECHO" to transfer the ASCII string to the RS-232 transmit buffer. If the RS-232 transmit buffer full flag is set, this module keeps calling "RSECHO" until the string is transferred. Because of this, this module is not called from interrupt service routines.

On completion, this module returns to the calling module.

MODULE #5

CNBIAS

Entry:
The following modules call this module: "WIRMOD", "MAINLP", "CMDEC", and "RSSPSR".
Referenced:
None.
Description:
This module converts either an 8 bit or 16 bit binary valve to an ASCII character string representing the valve in one of three radixes. The three possible radixes are: decimal, octal, and hexadecimal.

If the radix is octal the leading ASCII character will be the single quote. If the radix is hexadecimal the leading ASCII character will be the double quote.

On completion, this module returns to the calling module.

MODULE #6

PROMPT

Entry:
The following modules call this module: "WIRMOD", "MAINLP", and "RSRXSR".
Referenced:
The following module is called by this module: "ECHOWT".
Description:
This module sends the appropriate prompt out the RS-232 port. The different responses are as follows:
1. Command Mode = "CMD:"
2. Conversational Mode = "*"
3. Transparent Mode = ">"

On completion, this module returns to the calling module.

MODULE #7

MAINLP

Entry:
The following module calls this module: "WIRMOD".
Referenced:
The following modules are called by this module: "CMDEC", "CMDPAR", "CNBIAS", "CRPKT", "ECHOWT", "WIREMOD", "LSTCMD", "PROMPT".
Description:
This module ties all the wireless modem modules together. It supervises and initiates the needed actions at the right time. This module runs during the time the central processor is not servicing interrupts. Two eight bit words are continually scanned for any bit change indicating that there has been a significant event. The following describes each significant event:

Event No. 1: (Command String Ready to be Parsed)
This event happens while the modem is in the Command Mode and an ASCII string of characters terminated with a carriage return is received by way of the RS-232 receive port. When this event happens, this module calls the command parser which checks the string for a valid modem command. If the string is a valid command, then the CMDEC module is called to execute the desired action. If the string is invalid, an error message is printed. Then the string is cleared and the checking for another event is continued.

Event No. 2: (Restart Transmitting Data Out RS-232 Port)
This event is used to start retransmitting data out the port that was suspended because of the user being busy. This data flow control can be either software XON or XOFF or hardware RTS line. When the user sends an XON or sets the RTS line this event is initiated.

Event No. 3: (Link Down)
This event can be caused by one of two conditions. The first one is when a disconnect packet is received. When this condition occurs, the message "*** Disconnected from XX", where XX is the destination node, is transmitted out the RS-232 port. The second condition occurs after sending the last retry data packet and receiving no response from the destination node. In this case the message "Link is Down!" is sent out the RS-232 port.

Event No. 4: (Link Up)
This event is caused by either receiving a replay from a Log On packet or by receiving a Log On packet. In either case the message "*** Connected to XX" where XX is the destination node is sent out the RS-232 port.

Event No. 5: (Link Busy)
This event is caused by receiving a Node Busy packet from the destination node. When this occurs, the message "Link is busy!" is sent out the RS-232 port. Any further packet transmission is disabled until a Node Ready packet is received from the destination node.

Event No. 6: (Destination Logged To Another Node)
This event occurs while trying to log to a node that is already logged to another node. The destination node sends a Node Busy packet which, when received, causes this event. The message "Destination connected to another node!" is transmitted out the RS-232 port and the modem remains in the Command Mode.

Event #7: (Retry Failure)
This event occurs after sending the last retry packet and no reply packet is received. Upon this condition, the RS-232 receive buffers, pointers, and flags are re-initialized. If the modem is not set for Test, then the Mode is changed to Command Mode.

Event #8: (Re-enable Link Flow Control)

In order for this event to occur, a "Receive Not Ready" packet has to have been sent to the destination node. This occurs when the RS-232 transmit buffer becomes full or when the RS-232 device is not ready to receive data. Upon a request for more data from the RS-232 device, a "Receive Ready" packet is transmitted to the destination node to re-enable link flow control.

Event #9: (Send a Reply Packet)

This event can occur while the modem is in any state. This event is generated upon receiving a packet that requires a reply by way of the RF receive port. When this occurs the module named "CRPKT" is called to create the desired packet. This packet is moved to a transmit buffer to be transmitted as soon as possible.

Event #10: (Connect Cycle)

This event occurs when the RS-232 device requests to Log On to another node. If the modem is not currently linked to a node, a "Connect" packet is created then sent to the destination node. If the modem is currently linked to another node, a "Disconnect" packet is created to disconnect from the current node in order to link to the desired node.

Event #11: (Disconnect Cycle)

This event occurs when the RS-232 device requests to disconnect from another node. If the modem is currently connected to that node, then a "Disconnect" packet is created and sent.

Event #12: (Send Data)

This event occurs when the modem is in Converse Mode and there is data to be sent to the destination node. If the link is up and the destination is not busy, an "Information" packet is created and sent. If the link is down and the Destination Node number is not the Global address, a "Connect" packet is created and sent first. If the link is down and the destination node number is Global, an "Un-numbered Information" frame is created and sent. After emptying the message buffer, the RS-232 Input Buffer is checked for data. If no data exist, than the RS-232 Input Flow Control is re-enabled. If there is data, the data is moved from the RS-232 Input Buffer to the Message Buffer.

Event #13: (Prompt Pending)

The last event checked is for a pending prompt. If there is a pending prompt and the RS-232 Input Buffer is empty, then a prompt is sent out the RS-232 port.

MODULE #8

CRPKT

Entry:
The following module calls this module: "MAINLP".

Referenced:
None.

Description:
This module assembles the desired X0.25 packet into the HDLC transmit buffer. The different types of packets possible are as follows:
1. Numbered Information (Either)
2. Numbered Receive Ready (Response)
3. Numbered Reject (Response)
4. Numbered Receive Not Ready (Response)
5. Unnumbered Information (Either)
6. Unnumbered Disconnect (Command)
7. Unnumbered Acknowledge (Response)
8. Unnumbered Frame Reject (Response)
9. Unnumbered Disconnect (Response)
10. Unnumbered Set Asynchronous Balance Mode (Command)

After the packet is created, it is sent to the destination node.

MODULE #9

CMDPAR

Entry:
The following module calls this module: "MAINLP".

Referenced:
The following modules are called by this module: "ECHOWT", "CMDTBL".

Description:
This module is called while the modem is in the Command Mode and there is an ASCII string waiting to be parsed, which was received from the RS-232 port. The string is first parsed for a valid command. Then, the string is parsed for valid switch. Lastly, the string is parsed for a valid argument. The "CMDTBL" module provides all the valid commands and switches. The parser will accept any number of letters for the command or switch as long as they match only one command and one switch. If the parser finds multiple matches, it reports it as an ambiguous error.

The parser will accept both upper and lower case letters. The numeric arguments can be in either of the following radixes:
1. Decimal
2. Octal, specified by a preceeding single quote.
3. Hexadecimal, specified by a preceeding double quote.

While parsing the argument, any illegal characters for the specified radix will be reported as an "invalid character for argument".

If the parser cannot find a match for the command or switch, it is reported as an "Invalid Command" or as an "Invalid Switch". If the parser found a valid command and switch, the corresponding command number, switch number, or argument value is returned to the calling module.

MODULE #10

CMDTBL

Entry:
The following modules call this module: "CMDPAR", "LSTCMD".

Referenced:
The following modules are called by this module: none.

Description:
This module contains all the valid modem commands and switches used by "CMDPAR". Each command and switch are in alphabetical order. The total number of commands is also defined in this module. Since the commands and switches are variable in length, each one has a variable defining the beginning of each command and switch. The type of switch is defined as follows:
1. If the number of switches defined is zero, there is no switch or argument.
2. If the number of switches defined is less than 128, the switches are an alpha character type.

3. If the number of switches defined is equal to 128, the switch is an argument and is treated as a numeric value.

MODULE #11
CMDEC

Entry:
The following module calls this module: "MAINLP".
Referenced:
The following modules are called by this module: "CNBIAS", "ECHOWT", "E2REST", "E2SAVE".
Description:
The purpose of this module is to execute the desired command which was received through the RS-232 port. In order to do this, "CMDPAR" module has to have parsed a valid command. For the most part, the commands set the desired configuration of the modem. The possible types of commands are as follows:
1. Setting internal variables to the desired numeric valve.
2. Enabling or disabling modem functions.
3. Initiating a modem response.

MODULE #12
LSTCMD

Entry:
The following module calls this module: "MAINLP".
Referenced:
The following modules are called by this module: "CMDEC", "CMDTBL".
Description:
This module is used to output all the modem commands in alphabetical order out the RS-232 port. The command "HELP" is used to call this module. When entered and "CMDEC" decodes this command, a flag is set which is detected by "MAINLP", which, in turn, calls this module. After completion, "LSTCMD" clears the list flag and returns to "MAINLP".

MODULE #13
RSRXSR

Entry:
This module is entered when the interrupts are enabled and as ASCII character is received from the RS-232 port.
Referenced:
The following modules are called by this module: "PROMPT", "RSECHO".
Description:
The purpose of this module is to process all incoming characters from the RS-232 port. Unless the character is a specific control character, it is stored in a 256 byte buffer. Upon receiving a termination character or upon receiving the maximum number of characters specified, and if the destination buffer is empty, the total number of characters are moved to the command buffer if the modem is in Command Mode. Otherwise, the characters are moved to the message buffer. This module provides the following functions if enabled:
1. Echo character
2. Character deletion along with two user selectable responses:
   (a) Space-Backspace-Space
   (b) Back Slash
3. Purge buffer of all characters.
4. Print characters currently in buffer.
After completing its task, RSRXSR returns control to the interrupted module.

MODULE #14
RSSPSR

Entry:
This module is entered when the interrupts are enabled and if there was an RS-232 input error.
Referenced:
The following modules are called by this module: "CNBIAS", and "RSECHO".
Description:
If the reporting of errors have been enabled by the modem's command "TYPERROR", this module will report the following errors:
Error #1: "RS-232 RX Parity Error!"
This error is caused when their is a mismatch between the received character's parity and what the modem's parity is set for.
Error #2: "RS-232 RX Overrun Error!"
This error occurs when the modem's central processor unit fails to read an RS-232 character from the data buffer while more than three characters have been received. The third character is lost due to the fourth character being stored in its place.
Error #3: "RS-232 RX Framing Error!"
This error is caused by receiving an RS-232 character that was not terminated with stop bits.
Before the above messages are generated, the "Clear to Send" line is reset to inform the user that the modem's RS-232 receive port is busy. Next, the RS-232 receive status register is read and the information stored in memory for later use. Then the RS-232 receive port is reset, clearing the error condition. At this point, the module re-enables the interrupts.
Next, the module checks whether the "Type on Errors" have been enabled. If it is, then it decodes the stored error information and sends the appropriate error message. The decoding is as follows:
Bit #4 set indicates that Error #1 described above has occurred.
Bit #5 set indicates Error #2 described above has occurred.
Bit #6 set indicates Error #3 described above has occurred.
Finally, the "Clear to Send" line is set to inform the user that the modem's RS-232 receive port is ready to receive characters again and control is returned to the interrupted module.

MODULE #15
RSTXSR

Entry:
This module is entered when the interrupts are enabled and the modem is active, sending characters out the RS-232 port.
Referenced:
None
Description:
This module is responsible for transmitting characters out the RS-232 port. "MAINLP" starts the action by sending the first character out the RS-232 port. When it's time to transmit the next character, an interrupt is generated which in turn causes this module to be entered.

The first action is to see if the user is ready to receive the next character. If not, the serial port is reset to disable any further interrupts.

The next action taken is to see if the last character has been sent. If so, the serial transmit port is reset to disable any further interrupts.

Next, the character to be transmitted is checked for a "Carriage Return" character. If it is such, the following actions may occur.

1. If the "Carriage Return" has not been sent, it is transmitted and a flag indicating so is set.
2. If the "Carriage Return" has been sent, and if Nulls after "carriage return" is enabled and the last Null character has not been sent, a Null character is transmitted out the RS-232 port. When the last Null character has been sent, a check is made to see if auto-line-feeds have been enabled. If so, the next set of sequences dealing with "line-feeds" is executed.

Next, the character to be transmitted is checked for a "Line-Feed" character. If it is such, the following actions may occur:

1. If the "Line-Feed" has not been sent, it is transmitted and a flag indicating so set.
2. If the "Line-Feed" has been sent and if Nulls after "Line-Feeds" is enabled and the last character has not been sent, a Null character is transmitted out the RS-232 port. When the last Null character has been sent, the next character to be transmitted is sent.

If the character is neither a "Carriage Return" or a "Line-Feed", it is sent without any other checks. After sending the character, the RS-232 transmit buffer is shuffled to prepare for the next. After completing the above action, this module returns to the interrupted module.

MODULE #16

RSEXSR

Entry:

This module is entered when the interrupts and Hardware Flow Control are enabled and the "Clear to Send" line of the RS-232 port changes state.

Referenced:

None

Description:

As mentioned above, this module detects a change of the "Clear to Send" line. If the line swings positive or set, this indicates that the user is ready to receive and a flag is cleared. If the line swings negative, or reset, this indicates that the user is not ready to receive and a flag is set indicating so.

After the above action, the serial port is reset and control is returned to the interrupted module.

MODULE #17

TIMER

Entry:

This module is entered when the interrupts are enabled and a sixtieth of a second has gone by since the last interrupt from channel #1 of the counter timer hardware.

Referenced:

None

Description:

The purpose of this module is to provide all the timing functions used internally by the modem. These timing functions are in the form of user settable delays. The amount of delay is based on a tick which is 1/60 of a second, or 16.667 msec. The following describes each delay in order of execution:

1. Carrier Busy Delay: This delay is executed when a carrier detect signal is active or following transmission of a packet. Any new transmittal is disabled until after this period of time has elapsed without detecting any carrier detect signals. This delay is set by the user with the command "CARBSY n", where n equals the number of ticks to delay.
2. Transmit Data Delay: This delay is executed upon initiation of transmitting a packet. It is started right after turning on the radio transmitter. The purpose of this delay is to allow the radio transmitter to reach full power before sending any information. This delay is set by the user, with the command "TXDATA n", where n equals the number of ticks to delay.
3. Transmit Flag Delay: This delay is executed after completing the "Transmit Data Delay". The purpose of this is to allow HDLC flags to be sent before the actual packet is sent. This delay is set by the user with the command "TXFLAG n", where n equals the number of ticks to delay.
4. Transmit End Delay: This delay is executed after the module "HDTXSR" has sent the last packet byte. The purpose of this delay is to leave the radio transmitter on until the Cyclic Redundancy Check and some HDLC flags have been transmitted. This delay is set by the user with the command "TXEND n", where n equals the number of ticks to delay.
5. Transmit Acknowledge Delay: This delay is executed after completion of transmission of a packet if the packet calls for an acknowledgement from the destination node. This is to allow a user setable delay to elapse before sending a retry packet. On retries, a random number is added to the user value in order to help prevent collisions with other node transmissions. This delay is set by the user with the command "FRACK n", where n equals the number of ticks to delay.
6. Converse Idle Delay: This delay is executed if the modem is not in Command Mode, and if the idle delay is enabled, and if there has been no activity by the user or by the destination node for a period of time. If the total delay elapses without any activity to reset the delay, "TIMER" initiates a Log Off cycle. This prevents the node from typing up another node. The delay is set by the user with the command "IDLETIME n", where n equals the number of seconds to delay. To enable the Idle Time Out delay, the user uses the command "IDLECONT ON".

The following describes the sequence of steps that "TIMER" executes each tick.

Step #1: The first action taken by "TIMER" is to increment an internal 32 bit tick variable that is currently not used.

Step #2: The next step is to handle the carrier busy delay mentioned as delay #1 above.

Step #3: The next step is to check that the modem is not transmitting while the HDLC transmit buffer is empty. If it is, the transmission is terminated and jumps to Step #12.

Note: Steps #4 through #11 are executed while the HDLC transmit buffer has data to be transmitted.

Step #4: The next step checks whether the modem is waiting for a reply packet. If it is, step #11 is executed. If not, initiation of a packet transmission sequence is started by turning on the Transmitter Enable output port. Also, the Transmit Data Delay is initialized. Then "TIMER" jumps to step #12.

Step #5: This step executes the Transmit Data Delay mentioned as delay #2 above. While executing the delay, the next step taken is step #12. At the conclusion of this delay sequence, serial port #1 "Ready to Send" line is set, enabling the clock pulses from the Manchester Encoder to clock out HDLC flags out of serial port #1.

Step #6: This step executes the Transmit Flag Delay mentioned as delay #3 above. While executing the delay, the next step taken is step #12.

Step #7: This step initiates the sending of the data stored in the HDLC transmit buffer. It also initializes the Transmit End Delay. The next step taken is Step #12.

Step #8: This step checks whether the modem is still sending the data mendioned in Step #7. If it is, the next step executed is Step #12. If the modem has completed sending the data, then the Transmit End Delay is executed. While in this delay, the next step executed is Step #12.

Step #9: After completion of the Transmit End Delay, serial port #1 "Ready to Send" line is cleared, disabling the clock pulses from the Manchester Encoder which clocks out the HDLC data from serial port #1. Also, the transmitter enable output is cleared, turning off the radio.

Step #10: If a reply packet is not called for, then the HDLC transmit buffer is cleared, and the send sequence number is incremented by one. If a reply packet is called for, the Transmit Acknowledge Delay mentioned as delay #5 above is initialized and executed. The next step executed is Step #12.

Step #11: If no reply packet is received before conclusion of the Transmit Reply Delay and the total number of retry transmissions have not been exceeded, then another packet transmission is initiated and the retry count is decremented. If the last retry packet was sent, then the HDLC transmit buffer is cleared, the mode declared down, a flag is set, indicating a retry failure, and the total retry count reinitialized for the next packet.

Step #12: This step checks whether the Converse Idle Delay mentioned as delay #6 above needs to be executed. If it does, the above description for delay #6 is executed.

Step #13: This last step checks to see if the modem is in the Test Mode. If it is and the modem has not established a link with another node, then the output latch that drives the front panel Test LED is updated. This cycles the LED on and off at about a ½ second rate.

After completing the above steps, "TIMER" returns control to the interrupted module.

MODULE #18

HDTXSR

Entry:

This module is entered when the interrupts are enabled and the transmit data buffer for serial port #1 becomes empty.

Referenced:

None.

Description:

This module is used to transmit the data part of a packet. The module "TIMER" initiates the transmission by sending the first character. An interrupt to this routine is generated each time the transmit buffer of the serial port #1 becomes empty.

The following describes "HDTXSR":

Step #1: Check for last character sent. If it has been sent, jump to Step #4.

Step #2: Check whether the first data character is being sent. If it is, reset the Transmix Data Under Run Flag for serial port #1.

Step #3: Retrieve the data character from the HDLC Transmit buffer and store it in the serial port #1 data buffer. This will cause the character to be transmitted. Increment the data pointer by one. Jump to Step #5.

Step #4: This step resets serial port #1, dissabling any further interrupts to occur upon the data buffer becoming empty. Also, a flag is set to indicate to the module "TIMER" that the last data byte has been sent.

Step #5: Return control to the interrupted module.

MODULE #19

HDRXSR

Entry:

This module is entered when the interrupts are enabled and a data character of a packet addressed to the receiving node is received.

Referenced:

None

Description:

This module is used to receive the data part of a packet addressed to the receiving node. The following describes the steps taken:

Step #1: Input the data character from the receive buffer of serial port #1.

Step #2: Check whether the character received was the first. If not, jump to step #4. If it is, check that the character matches either the node's address or that it is the Global Address. If it does, store the character in the HDLC receive buffer, clear the HDLC end of frame flag and jump to step #3.

Step #3: Check whether the HDLC receive end of frame flag is set. If it is, jump to step #5. If not, increment the receive character pointer and increment the character count.

Step #4: Store the received character into the HDLC receive buffer. Increment the character address pointer and increment the total character count. Check the character count for an overflow condition. If not, jump to step #5. If there is an overflow condition, reset the character count and pointer, reset the receive CRC generator, and put the receive HDLC port back into a Receive Hunt mode.

Step #5: Return control to the interrupted module.

MODULE #20

HDSPSR

Entry:

This module is entered when the interrupts are enabled and the End HDLC Flag is received from an incoming packet.

Referenced:

This module calls the following module "RSECHO".

Description:

This module is entered upon completion of receiving a packet. The purpose of this module is to verify that the packet is error free, determine the type of packet received, and if a reply packet is needed. The following describes the steps:

Step #1: Check the status register at serial port #1 for errors that may have occurred while receiving the HDLC packet. If no errors, jump to step #2. If there were errors, check to see if they should be reported. If type error is disabled, jump to step #12. If there were errors, check to see if they should be reported. If the modem command "TYperror" is disabled, jump to step #12. If type error is enabled, identify whether the error was a "HDLC Receive Overrun Error" or a "HDLC Receive CRC Error" and send the respective error message using the module "RSECHO". After sending message, jump to step #12.

Step #2: Check the received packet for a Log On packet. If not, jump to step #3. If the received packet was a Log On packet, then the source address of the packet is checked against the node's destination address. If they are equal, the received and send sequence numbers are cleared and the node status is changed to being logged to another node. If the source address does not match the node's destination address, then the status of the node is checked for not currently being logged to another node. If not logged to another node, the received and send sequence numbers are cleared and node status is changed to being logged to another node. In both cases above, an Un-numbered Acknowledge packet is called for and a jump to step #12 is made. If the modem is currently logged to a node that is different from the source address of the Log On packet, then a reply packet is sent reporting that fact. A jump is then made to step #12.

Step #3: Checks the received packet for a Disconnect Packet. If not, a jump is made to step #4. If it was, a check is made to see if the modem's destination address matches the received packet source address. If they match, the modem's status is changed to being disconnected. Also, a check is made to see if the modem is currently trying to send a Disconnect Packet. If it is, it is cancelled and the corresponding flags cleared and an unnumbered reply packet is initiated. If the received source address does not match the modem's destination address, a jump is then made to #12.

Step #4: Checks the received packet for an Unnumbered Acknowledge packet. If not, a jump is made to step #5. If so, the flags associated to sending a packet are cleared, sending any further retransmission of an existing packet. Next, a check is made for whether a disconnect cycle is in progress or whether a connect cycle is in progress. If the modem is currently disconnecting, the modem's status flag is cleared. If the modem is currently connecting, the modem's status flag is set. A jump is then made to step #12.

Step #5: Checks the received packet for an Unnumbered Disconnect Mode packet. If not, a jump is made to step #6. If so, the flags associated to sending a packet are cleared, ending any further packet retransmissions. Next, the flag indicating that the destination modem is already logged to another modem is set. Then a jump is made to step #12.

Step #6: Checks the received packet for an Unnumbered Information packet. If not, a jump is made to step #7. If so, a check is made to see if Global Address is enabled. If not, a jump to step #12 is made. If Global Address is enabled, the received packet destination address is compared to the global address value of 255. If not, a jump to step #12 is made. If so, the received data is terminated. Then the module "RSECHO" is called to transmit the data out the RS-232 port. Then a jump to step #12 is made.

Step #7: Checks the received packet for a Receive Not Ready packet. If not, a jump is made to step #8. If so, a flag indicating that the destination modem is busy is set and the retransmission count is reinitialized. Then a jump to step #12 is made.

Step #8: Checks the received packet for a Receive Ready packet. If not, a jump is made to step #9. If the received packet was a Receive Ready packet, then the Converse Idle activity flag is reset and the flag indicating that a prompt is needed is set. Then a jump to step #10 is executed.

Step #9: Checks the received packet for an Information packet. If not, a jump is made to step #10. If the received packet was an Information packet, then a check is made to determine whether the RS-232 Transmit port is busy or not. If the RS-232 port is busy, a "Receive Not Ready" packet is created to send back to the Destination Node. If the RS-232 port is ready to receive information, then the Converse Idle activity flag is reset and the Receive Sequence Number is compared to an internal sequence number. If the sequence number does not match, then the Received Sequence Number is incremented by one and compared again against the Internal Sequence Number. If they match, then the Received Information packet is a repeat and a jump is made to step #10. If the sequence number still does not match the Internal Sequence Number, then an error message "HDLC receive RESTV sequence error" is sent out the RS-232 port if the command "TYPERROR" is enabled and a jump to step #12 is made. If the Receive Sequence number matched the Internal Sequence Number, then the received packet is stripped of its information and the module "RSECHO" is called to transmit this information out the RS-232 port. If "RSECHO" indicates that the RS-232 transmit buffer was full, then a "Receive Not Ready" packet is created to send back to the destination node and a jump to step #12 is made. If the information was successfully transferred, then the Internal Sequence Number is incremented by one. Next, "HDSPSR" checks whether the modem is actively transmitting a packet or not. If it is, the packet being transmitted is checked for a Numbered Packet. If the transmitted packet is an unnumbered packet, a jump to step #10 is made. If the transmitted packet is a numbered packet, then its Receive Sequence Number is updated to match the current Internal Sequence Number.

Step #10: Checks whether the modem is currently waiting for a reply packet. If not, a jump to step #11 is made. If the modem is currently waiting for a reply packet, the received numbered packet is stripped of its Send Sequence number. This number is compared to the modem's Internal Send Sequence number. If the two numbers do not match, then a check is made to see whether the Destination Node was busy. If the Destination Node was not busy, then an error message "HDLC receive SESTV sequence error" is sent out the RS-232 port if the command "TYPERROR" is enabled and a jump to step #11 is made. If the destination node was busy, the Send Sequence number is incremented by one and compared once again to the Internal Send Sequence number. If they still don't match, the error message "HDLC receive SESTV sequence error" is sent out the RS-232 port if the command "TYPERROR" is enabled and a jump to step #11 is made. If they do match, the Destination Busy flag is cleared and a jump to step #11 is made. If the stripped Send Sequence Number matches the Internal Send Sequence Number, then the Transmit Retry flag, and the Destination Busy flag are cleared after a check is made to determine if the Destination Busy flag was set. If the flag was not set, then the HDLC Transmit buffer full flag is cleared. Next, a jump to step #11 is made.

Step #11: Checks the received packet control byte for a reply packet. If the received control byte does not call for a reply packet, a jump to step #12 is made. If the received control byte does call for a reply packet, a "RECEIVE READY" packet is specified for transmitting to the destination node. Next, step #12 is executed.

Step #12: Resets the HDLC serial hardware to hunt for another packet. Next, a flag indicating that the end of the received HDLC packet was received is set. The Received HDLC data pointer and counters are reinitialized. Finally, control is returned to the interrupted module.

MODULE #21

E2MSRV

Entry:
This module is entered when the interrupts are enabled and channel #4 counter of the Clock Timer Circuit has decremented to zero.

Referenced:
None.

Description:
The purpose of this module is to provide all communication to and from the modem's internal non-volatile Random Access Memory. Another name for the chip is "E RAM". There are two of these E RAM in the modem. They provide enough storage for two complete default configurations to be either saved or restored from. The E RAM is interfaced to by a 4 bit output latch and an 8 bit input latch. Only two of the 8 bits of the input latch are used for the E Ram. These two inputs, one for each E RAM, transfer the data from the E RAM into the CPU's accumulator. The E RAM are a serial device, that is, the data is serially clocked in and out of the chip. The clock rate is provided by a clock timer circuit chip set to interrupt roughly at a 1 Khz rate.

The E RAM supports seven basic operations or instructions. They are as follows:
1. Read one 16 bit internal register.
2. Write one 16 bit internal register.
3. Erase one 16 bit internal register.
4. Erase/Write Enable.
5. Erase/Write Disable.
6. Erase All causes all 16 internal registers to be erased.
7. Write All causes a bit pattern to be written to all 16 internal register.

These instructions all start with a start bit and have a four bit operation field. Following the operation field is a four bit address field that specifies the desired internal register to perform the desired function to. Four of the seven instructions ignore this address field. They are Erase/Write Enable, Erase/Write Disable, Erase All Registers, and Write All Registers. Two instructions, Write Register and Read Register, have a 16 bit data field following the address field.

To control the E RAM operations, there are five one byte variables, one two byte variable, and one three byte variable. To start a E RAM cycle, these variables are preloaded with the correct valves and the Counter Timer Chip started. Upon completion, a flag is cleared and the Counter Timer Chip disabled.

The following describes in detail the steps taken:

Step #1: Checks the current clock count for a start of an E RAM cycle. If not, a jump is made to step #2. If it is the start of a E RAM cycle, the command byte is loaded and the correct total clock count is loaded. Next, the correct 4 bit operation field and the 4 bit address field is loaded into the data buffer. The data field is then cleared and a check is made whether the E RAM cycle is a Read or Write cycle. If not, a flag is set indicating that the E RAM cycle is active and a jump to step #13 is made. If the current E RAM cycle is a Read or Write cycle, then the current E RAM internal register count is checked for zero. If this register is zero, then the Default Variable pointer is reinitialized to the first variable and the Default Sum variable cleared. Next, a check is made for a Write Cycle. If the cycle is a Write cycle, then the next Default Variable is loaded into the data field of the data buffer. Next, a flag is set indicating that the E RAM cycle is active and a jump to step #13 is made.

Step #2: Checks the total clock cycle count down variable for a value of zero. This indicates that the current E RAM cycle has finished. If the variable is zero, a jump to step #9 is made. If the variable is not currently zero, then the current clock cycle up counter is tested for being odd. If the clock cycle up counter is at an odd state, a jump is made to step #13: otherwise step #3 is executed.

Step #3: Checks the current clock cycle up counter for a value of two. This indicates time to send the E RAM start bit. If the current clock cycle up counter is not equal to two, then a jump to step #4 is made. If the counter is equal to two, then bit three of the E RAM Output Latch variable is set and a jump to step #13 is made.

Step #4: Checks the current clock cycle up counter for a value of less than 18. If it is, this indicates that the operation field is still being shifted into the E RAM so a jump to step #12 is made. Otherwise the next step is executed.

Step #5: Checks the E RAM flag variable for whether the current cycle has data to send or receive. If not, a jump to step #6 is made. If there is data a check is made for whether the current E RAM cycle is a Write cycle. If it is, the current clock cycle up counter is checked for a value of less then fifty. If it is, this indicates that the data is still being shifted into the E RAM so a jump to step #12 is made. If the current clock cycle up counter is equal or greater than fifty, then a jump to step #6 is made. If the current E RAM cycle is not a Write cycle, then a check is made for a Read cycle. If the current E RAM cycle is not a Read cycle, a jump to step #6 is made. If it is, the current clock cycle up counter is checked for a value of less than fifty-two. If it is, this indicates that the data is still being shifted out of the E RAM so a jump to step #12 is made. If not, the next step is executed.

Step #6: Checks whether the current E RAM cycle requires a delay pulse. If not, a jump to step #8 is made. If the current E RAM cycle needs a delay pulse, then the E RAM flag variable is checked to see whether the modem is currently executing the delay pulse. If it is, a jump to step #7 is made. If not, the E RAM flag variable is set to indicate that the modem is currently executing a delay pulse and the E RAM output latch is configured for a delay pulse. Then a jump to step #13 is made.

Step #7: Checks the clock cycle down counter for a value equal to or less than six. If not, this indicates that the delay pulse is not ready to be terminated so a jump to step #13 is made. If the counter is equal to or less than six, the E RAM output latch is configured for termination of the delay pulse and a jump to step #13 is made.

Step #8: Checks the clock cycle down counter for a value equal to or less than four. If not, a jump to step #13 is made. If the clock cycle down counter is equal to or less than four, the E RAM output latch is configured to terminate the current E RAM cycle, and a jump to step #13 is made.

Step #9: Checks the E RAM status flag variable of a Read cycle. If not, a jump to step #10 is made. If the current E RAM cycle is a Read cycle, the E RAM internal register count is checked for zero. If this register is zero, then the Default Variable pointer is reinitialized to the first default variable. Next, the sixteen bits of data is processed. The first eight bits are checked for a value of 255. If the first byte is equal to 255 and the E RAM Internal Register Count is zero, the Blank E RAM flag is set. Next, the address of the current eight bit default variable is found and the Read eight bits are stored. Then the eight bits are added to the current default Sum variable. Next, the Default variable pointer is incremented by two and the address of the last eight bit Default Variable is found. Then the last eight bits of data are stored into the Default Variable and added to the current Default Sum Variable. The next step is then executed.

Step #10: Checks the E RAM flag variable to determine whether the current E RAM cycle has data. If not, a jump to step #11 is made. If the current E RAM cycle has data, then the E RAM Internal Register Count Variable is incremented by one and then checked to determine whether the last sixteen bit register has been processed. If it has, then a jump to step #11 is made; otherwise the current E RAM clock cycle up counter is cleared. The E RAM delay pulse flag is cleared, and a jump to step #13 is made.

Step #11: Sets the E RAM cycle done flag. Channel #4 of the Clock Timer Chip is disabled, and the E RAM flag variable is checked to determine whether the current E RAM cycle was a Read cycle. If not, a jump to step #13 is made. If the current E RAM cycle is a Read cycle, the Blank E RAM flag is checked for a set condition. If the blank E RAM flag is already set, a jump to step #13 is made. If the blank E RAM flag was not set, the Default Variable Sum variable is checked for a value of zero which would indicate that the modem currently does not have an E RAM. If the Default Variable sum is equal to zero, the Blank E RAM flag is set. Next, a jump to step #13 is made.

Step #12: Shifts the data in the E RAM three byte data buffer to the left by one bit in preparation for the next E RAM clock cycle. At the same time the data is shifted left, the current E RAM chip data input port is read and its data bit shifted into the least significant bit of the three byte data buffer. After the data has been shifted, the E RAM output latch is configured according to the carry flag. If the carry flag is cleared, bit three of the E RAM output latch is cleared. If the carry flag is set, then bit three of the E RAM output latch is set. Then the next step is executed.

Step #13: Loads the E RAM output latch variable and either sets bit two, if the current E RAM clock cycle up counter is odd, or clears bit two if the current E RAM clock cycle up counter is even. This toggling of bit two provides the hardware clock pulse which the E RAM needs to function. The loaded variable is then output to the E RAM. Next, the current E RAM clock down counter is checked for a value of zero. If the current E RAM clock down counter is not equal to zero, the current E RAM clock cycle down counter is decremented by one and the current E RAM clock cycle up counter is incremented by one. Finally, control is once again returned to the interrupted module.

MODULE #22

E2SAVE

Entry:
This module is called by the module "CMDEC".
Referenced:
This module calls the following module "SAVDFT".
Description:
The purpose of this module is to supervise the writing of all the modem's current command setting into the E RAM. The following describes the steps taken:

Step #1: Calls the module "SAVDFT" to update the internal default variable to reflect the current state of the modem's commands that have a switch of either ON or OFF.

Step #2: Loads the E RAM command variable for an Erase/Write Enable cycle. Next, the E RAM flag variable is configured for the correct E RAM chip and the busy flag is set. Then the E RAM clock cycle up counter and the E RAM internal register count variable are cleared. Next, channel #4 of the Clock Timer Chip is initialized to provide a 1 Khz clock rate and then enabled. This action starts the interrupt service module "E2MSRV", which in turn actually executes the E RAM Erase/Write Enable cycle. Then, this module waits for the E RAM done flag before proceeding to the next step.

Step #3: Loads the E RAM command variable for an E RAM Erase All cycle. Next, the E Ram flag variable is configured for the correct E RAM chip, a delay pulse, and for a busy condition. Then the E RAM internal register count variable are cleared. Next, channel #4 of the clock timer chip is initialized to provide a 1 Khz clock rate and then enabled. This action starts the interrupt service module "E2MSRV", which in turn actually executes the E RAM Erase All cycle. Then this module waits for the E RAM done flag before proceeding to the next step.

Step #4: Loads the E RAM command variable for an E RAM Write Register cycle. Next, the E RAM flag variable is configured for the correct E RAM chip, a delay pulse, a write cycle, and for a busy condition. Then the E RAM clock cycle up counter and the E RAM internal register count variable are cleared. Next, channel #4 of the Clock Timer Chip is initialized to provide a 1 Khz clock rate and then enabled.

This action starts the interrupt service module E2MSRV", which in turn actually executes the E RAM Write Register cycle. Then this module waits for the E RAM done flag before proceeding to the next step.

Step #5: Loads the E RAM command variable for a E RAM Erase/Write Disable cycle. Next, the E RAM flag variable is configured for the correct E RAM chip, and for a busy condition. Then the E RAM clock cycle up counter and the E RAM internal register count variable are cleared. Next, channel #4 of the Clock Timer Chip is initialized to provide a 1 Khz clock rate and then enabled. This action starts the interrupt service module "E2MSRV", which in turn actually executes the E RAM Erase/Write Disable cycle. Then this module waits for the E RAM done flag before proceeding to the next step.

Step #6: Returns control to the calling module.

MODULE #23

E2REST

Entry:
This module is called by the modules "WIRMOD" and 'CMDEC".
Referenced:
This module calls the following module "RESDFT".
Description:
The purpose of this module is to supervise the reading of all the stored modem's command settings from the E RAM. The following describes the steps taken:

Step #1: Loads the E RAM command variable for a Read Register cycle. Next, the E RAM flag variable is configured for the correct E RAM chip, a read cycle, a data cycle, and for a busy condition. Then the E RAM clock cycle up counter and the E RAM internal register count variable are cleared. Next, channel #4 of the clock timer chip is initialized to provide a 1 Khz clock rate and then enabled. This action starts the interrupt service module "E2MSRV", which in turn actually executes the E RAM Read Register cycle. Then, this module waits for the E RAM done flag before proceeding to the next step.

Step #2: Calls the module "RESDFT" to set the modem's commands that have a switch of either ON or OFF to the setting just read from the E RAM. Then this module returns control to the calling module.

MODULE #24

SAVDFT

Entry:
This module is called by the module "E2SAVE".
Referenced:
This module calls the following module "CMDEC".
Description:
The purpose of this module is to set the default variable bits to the current setting of the modem's commands that have a switch of either ON or OFF. If the bit is set, it indicates that the associated command is currently ON. If the default variable bit is cleared, it indicates that the associated command is currently OFF. The commands are found by searching the tables in module "CMDTBL". After the command is identified, the associated command number is stored in the command number variable and the command switch variable set to a value of 80 Hex. Then the module "CMDEC" is called, which interprets the 80 Hex as to return the current switch setting of that desired command. This same process is repeated until all the ON/OFF type commands have been interrogated and the corresponding bit in the default variable set accordingly. Then control is returned to the calling program.

MODULE #25

RESDFT

Entry:
This module is called by the module "E2REST".
Referenced:
This module calls the following module "CMEC".
Description:
The purpose of this module is to set the modem's commands that have a switch of either ON or OFF to the current state of the default variables. Each bit in the default variable represents one command's switch setting. If the bit is set, the corresponding command's switch is set to ON. If the default bit is cleared, then the corresponding command's switch is set to OFF. The commands are found by searching the tables in module "CMDTBL". After the command is identified, the associated command number is stored in the command number variable. The command switch variable is set from the current setting of the default variable bit. Then the module "CMDEC" is called, putting the command in the proper state. This same process is repeated until all the ON/OFF type commands have been set to the state specified by the default variables. Then control is returned to the calling program.

MODULE #26

DUMSRV

Entry:
This module is entered when the interrupts are enabled and any of the following three devices interrupts: Channel A External/status change of the serial Input/Output chip, and Channels #1 and #2 of the Clock Timer Chip.
Referenced:
None.
Description:
The purpose of this module is to handle any interrupts that may occur from a device that is not currently being used. If one of these devices do cause an interrupt, a corresponding activity variable is incremented, the interrupts re-enabled, and a return to the interrupted module executed.

MODULE #27

COPYRI

Entry:
This module is referenced by the module "CMDEC".
Referenced: None.
Description:
This module provides the ASCII verbage used by the modem's command "COPYRI".

MODULE 190 28

RAMDEF

Entry:
This module is referenced by most of the other modules.
Referenced:
None.
Description:

This module defines all of the modem's internal variables used by all the modules. These variables end up being stored in the modem's Random Access Memory.

The following commands are user software selectable and stored in the internal EEProms shown in FIG. 5 as 29: Auto Line Feed (on/off), Address, Unit (1–255), Backspace (on/off), Carrier Busy Delay, Command Time Delay, Command Mode Character, Connect Address (1–255), Converse Command Character, Disconnect Character, ECHO (on/off), FRACK (1–16), Help Commands, HDLC Baud Rate (155–9900), NULLS (0–30), NUCR (on/off), NULF (on/off), Packet Data Length (1–256), Peek I/O, Peek Memory, Radio (on/off), Software Reset, Packet Retry (1–256), Save (Store default in EEProm), SENDPAC, START, STOP, TRANS, TX Delay, TX End Delay, Type Error Messages, Xon/Xoff protocol.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

We claim:

1. A wireless modem for transferring data between host computer devices in a computer local area network, said modem comprising:
   transceiver means for broadcasting and receiving radio frequency signals;
   port means adapted to be operably connected to a host computer device for transferring data in a machine readable format;
   controller means operably connected between the transceiver means and the port means for respectively assembling data into discrete packets or converting packets of data to a machine readable format as data is either received from or delivered to a host computer device through said port means;
   encoder-decoder means operably connected to said controller means for respectively modulating or demodulating each packet of data broadcast or received by said transceiver means;
   and a programmed central processing unit (CPU) operably connected to said transceiver means, port means, and controller means for assuring orderly networking of the modem by:
   (a) delaying the broadcast of signals by the modem while another modem within a network is broadcasting;
   (b) comparing address information in each received packet of data to a preassigned address for the modem;
   (c) requiring that receipt of each packet of data broadcast by the modem be verified by the modem to which it is being sent prior to broadcast of a subsequent packet of data.

2. The wireless modem of claim 1 wherein the CPU is programmed to rebroadcast each packet of data until its receipt by the modem to which it is being sent is verified.

3. The wireless modem of claim 1 wherein the CPU is programmed to rebroadcast each packet of data until its receipt by the modem to which it is being sent is verified; and means for permitting a user of the modem to select the number of rebroadcasts of a packet of data that will be attempted before termination of broadcasting by the modem.

4. The wireless modem of claim 1 wherein said controller means converts data in a machine readable format to or from a High Level Data Link (HDLC) format.

5. The wireless modem of claim 1 wherein said controller means converts data in a machine readable format to or from a High Level Data Link (HDLC) format which includes an Address field.

6. The wireless modem of claim 1 further comprising:
   buffer means for holding data as it is moved between said transceiver means, port means, and controller means for permitting the modem to manipulate data at a speed different from that of its host computer device.

7. The wireless modem of claim 1 further comprising:
   test/enable means for emulating the operation of a host device for testing the broadcasting and reception of signals by the modem.

8. The wireless modem of claim 1, further comprising:
   means for continuously broadcasting a test signal from the modem.

9. A wireless modem for transmitting data received from a host computer device in a computer local area network, said modem comprising:
   transmitter means for selectively broadcasting a radio frequency signal on a preassigned frequency channel;
   port means adapted to be operably connected to a host computer device for transferring data to the modem in a machine readable format;
   controller means operably connected between the transmitter means and the port means for assembling transferred data into discrete packets as it is received from the host computer device;
   encoder means operably connected to said controller means for modulating each packet of data;
   and a programmed central processing unit (CPU) for controlling the operation of the transmitter means, port means and controller means to assure orderly networking of the modem by:
   (a) delaying the broadcast of signals by the modem while another modem within a network is broadcasting a radio frequency signal on the assigned channel;
   (b) assigning address information to each packet of data to identify a receiving modem in the network;
   (c) requiring that verification of receipt of each packet of data by the receiving modem be processed by the CPU prior to broadcast of a subsequent packet of data.

10. The modem of claim 9, further comprising:
    means for randomly delaying transmission of radio frequency signals by said transmitter means when another modem is transmitting on the assigned channel.

11. The modem of claim 9, further comprising:
    means for causing said controller means and encoder means to repeat the processing of a packet of data if verification of its receipt is not received by the CPU within a specified time after it is broadcast by said transmitter means.

12. The modem of claim 9, further comprising:

means operably connected to said transmitter for selectively braodcasting a test signal on the assigned channel.

13. The modem of claim 9, further comprising:
means operably connected to said transmitter for selectively emulating operation of a host computer device without transfer of data through said port means for testing the operation of a network of modems including the modem.

14. A wireless modem for receiving data directed to a host computer device in a computer local area network, said modem comprising:
receiver means for selectively receiving a broadcast radio frequency signal;
port means adapted to be operably connected to a host computer device for transferring data between the modem and the host computer device in a machine readable format;
decoding means operably connected to said receiver means for demodulating received radio frequency signals;
controller means operably connected between the receiver means and the port means for converting the demodulated data to a machine readable format;
and a programmed central processing unit (CPU) for controlling the operation of the receiver means, port means, and controller means to assure orderly networking of the modem by:
  (a) returning said receiver means to a standby receiving condition if address information within the decoded data fails to match a preassigned address for the modem;
  (b) returning said receiver means to a standby receiving condition if errors are detected in the demodulated data;
  (c) verifying receipt of data by its host computer device by a handshaking protocol.

15. The modem of claim 14, further comprising:
transmitter means operably controlled by said CPU for broadcasting a signal indicating receipt of data by its host computer device.

* * * * *